United States Patent [19]

Jobe

[11] Patent Number: 5,585,006

[45] Date of Patent: Dec. 17, 1996

[54] CLARIFIER HAVING SLUDGE PICK-UP TUBES

[76] Inventor: Warren D. Jobe, 205 Southern Dr., Neosho, Mo. 64850

[21] Appl. No.: 440,702

[22] Filed: May 15, 1995

[51] Int. Cl.$^6$ .................................................. B01D 21/04
[52] U.S. Cl. ......................... 210/776; 210/803; 210/523; 210/525
[58] Field of Search ..................... 210/523, 513, 210/524, 538, 768, 776, 800, 803, 525

[56] References Cited

U.S. PATENT DOCUMENTS

| 3,796,315 | 3/1974 | Chapman et al. | 210/523 |
| 4,007,119 | 2/1977 | Antonevich | 210/523 |

FOREIGN PATENT DOCUMENTS

| 1477859 | 5/1989 | U.S.S.R. | 210/523 |

OTHER PUBLICATIONS

Chemical Engineers Handbook, Perry & Chilton, 5th Ed., McGraw Hill, 1973 pp. 19-44 to 19-57.

*Primary Examiner*—Robert J. Popovics
*Attorney, Agent, or Firm*—Polster, Lieder, Woodruff & Lucchesi, L.C.

[57] ABSTRACT

A rectangular clarifier of 1,000,000–2,000,000 gal/day capacity capable of simultaneously removing sludge and skimming floating solids from a clarifier tank using a series of hollow arms which sweep the base of the clarifier and depend from a hollow tube which has a main body below the surface of the liquid level in the clarifier so a differential head pressure forces sludge up the arms into the tube which also has an open top to skim floating solids from the surface of the tank as the tube is rocked back and forth to duck the opening beneath the liquid surface. One end of the tube is open to a sludge pit which is provided with a sump pump whereby when the liquid level in the sludge pit is lowered below the level in the clarifier tank, sludge from the tube flows into the sludge pit because of the difference in pressure.

15 Claims, 6 Drawing Sheets

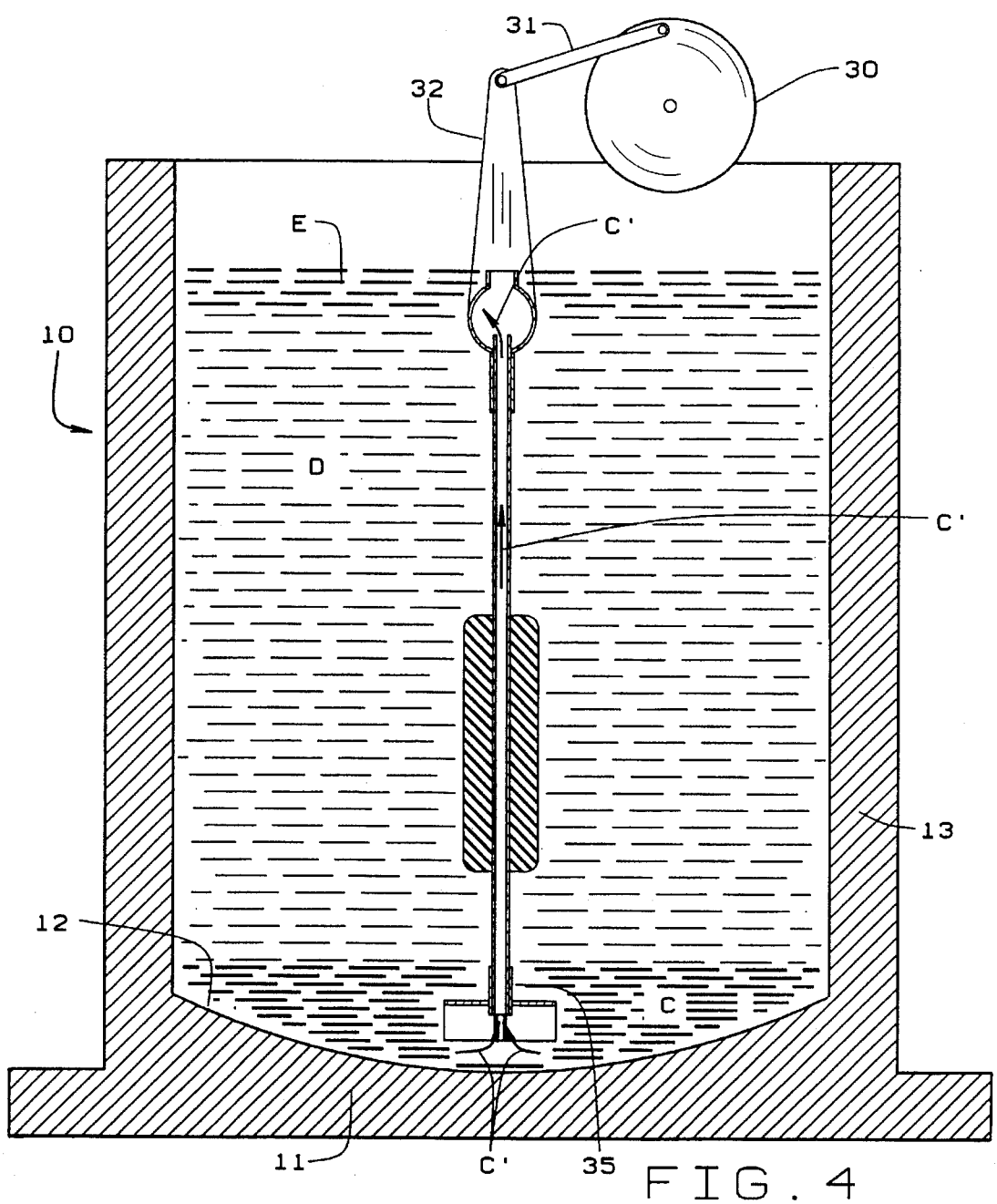
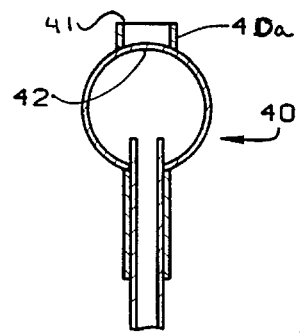 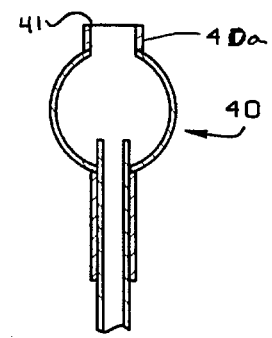
FIG. 7  FIG. 8

5,585,006

CLARIFIER HAVING SLUDGE PICK-UP TUBES

BACKGROUND OF THE INVENTION

This invention relates to clarifiers and in particular relates to a rectangular clarifier having a settled sludge pickup tube and a scum skimming trough.

Clarifiers are a type of gravity sedimentation device and are generally employed with dilute suspensions, principally industrial and domestic wastes, and their primary purpose is to produce a relatively clear overflow.

A typical rectangular clarifier has a chain type drag which pulls sludge from the bottom and deposits it in a sludge hopper along one wall of the clarifier. A revolving scum skimmer can be used with this type installation or the drag flights can act as scum skimmers on their return across the top of the clarifier.

A typical circular clarifier has a rotating superstructure from which is suspended a series of rake arms which move across the bottom of the clarifier and move the solids toward a sludge sump located at the center of the clarifier bottom. A rotating scum skimmer can be incorporated into a circular clarifier as well.

Circular mechanisms also have been modified to fit into square clarifier tanks by adding hinged corner blades to the rake arms to sweep the corners that lie outside the path of the main mechanism.

Accordingly, it is a principal object of the present invention to provide a rectangular clarifier having a combination sludge and scum removal device which includes a hollow main tube positioned at the center of the clarifier along the long axis and partially submerged in the clarifier liquid. The main tube rocks back and forth so that the entire bottom of the clarifier is covered by hollow sludge withdrawal tubes which are open at the bottom and connected to the hollow main tube to remove the sludge by differential head pressure which forces settled sludge up the withdrawal tubes into the main tube while the scum is picked up from the top of the clarifier liquid by an open decanter top extension on the main tube.

It is another object to provide a rectangular clarifier of small size, i.e., 1,000,000–2,000,000 gal/day capacity and a maximum width of about 20 feet for a single sludge and scum removal device. It is contemplated that a series of clarifier units can be linked together in a single housing and single sludge pit to provide increased capacity.

Still another object is to provide a rectangular clarifier in which the flow of sludge in the withdrawal tubes can be adjusted by moving the open end of the tube toward or away from the floor of the clarifier.

A further object is to provide a rectangular clarifier which can be adjusted from a combined sludge removal and scum skimming function to just a sludge removal function.

These and other objects and advantages will become apparent hereinafter.

The present invention comprises a rectangular clarifier having the capacity of removing solids from the floor of the clarifier basin by differential pressure while simultaneously skimming floating liquids from the top surface of the liquid in the clarifier.

DESCRIPTION OF THE DRAWINGS

In the drawings where like numerals refer to like parts wherever they occur:

FIG. 4 is a vertical sectional view taken through the clarifier along the short axis showing the collector assembly in vertical position;

FIG. 7 is a sectional view through the scum skimming trough showing it in closed or no skim position;

FIG. 8 is a view similar to FIG. 7 showing the scum skimming trough in open or skimming position;

DETAILED DESCRIPTION

Figure 1:
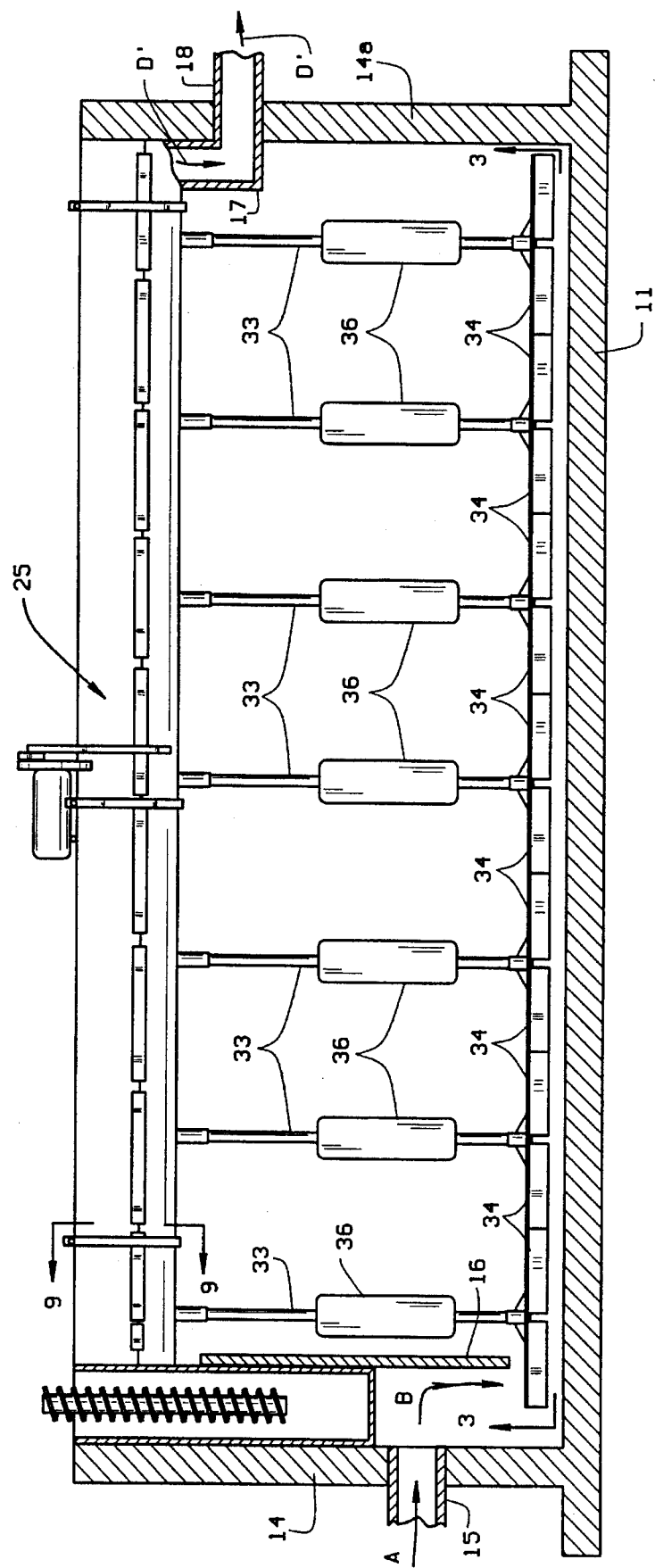
FIG. 1 is a vertical sectional view through the clarifier along the long axis.
Figure 2:
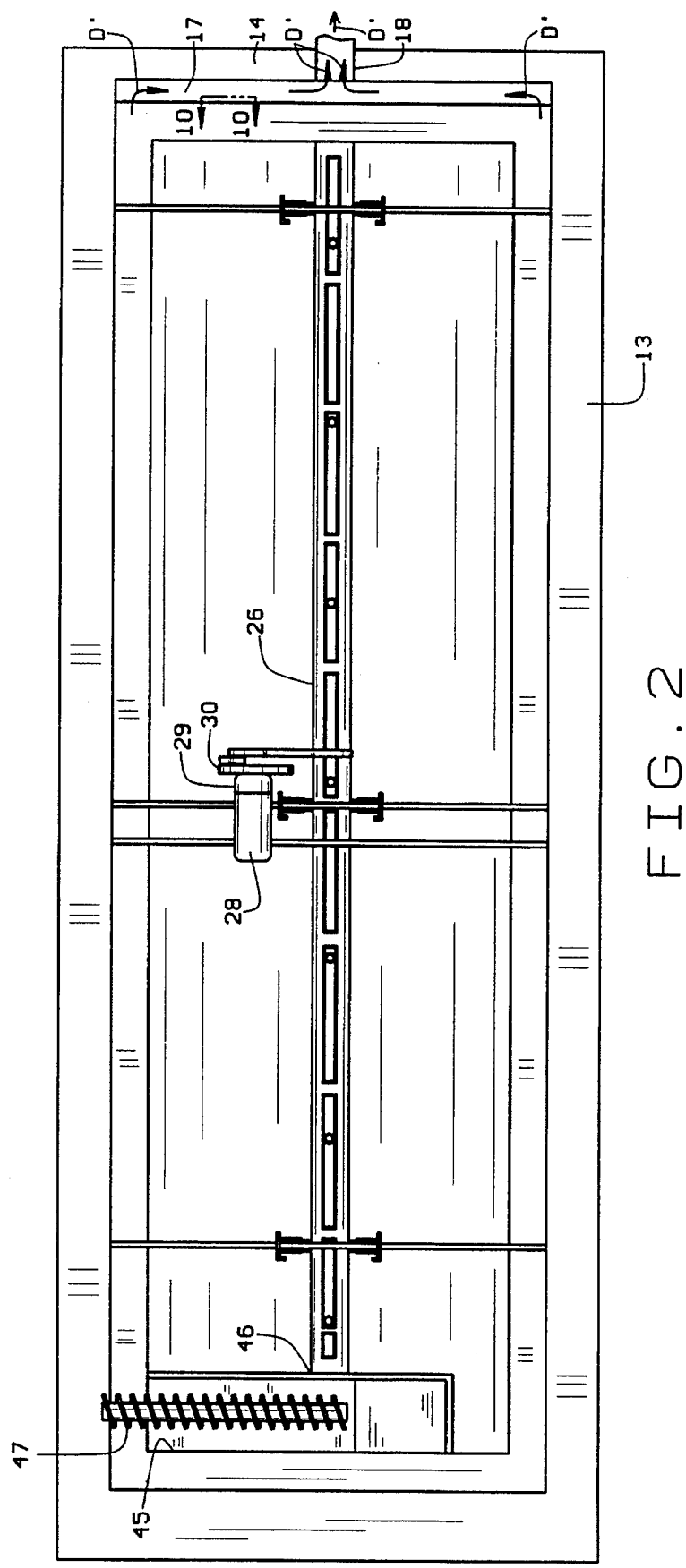
FIG. 2 is a a top plan view of the clarifier shown in FIG. 1.
Figure 3:
FIG. 3 is a bottom view of the sludge collector assembly taken along line 3—3 of FIG. 1.

The rectangular clarifier 10 shown in FIGS. 1, 2 and 4 comprises a bottom wall 11, which preferably has a curved inside surface 12 to provide more efficient removal of sludge, long axis side walls 13 and short axis end walls 14, 14a. The clarifier walls 11, 13, 14, and 14a are preferably poured concrete construction.

At one end wall 14 is an inlet pipe 15 through which the fluid to be treated enters the clarifier 10. An inlet baffle 16 is positioned opposite the inlet 15 inside the clarifier 10 to direct all incoming fluid toward the bottom inside clarifier wall 13. The baffle 16 is positioned from about 6 inches above the water surface to within about 2 feet of the clarifier basin floor 13 and across the entire width of the clarifier 10.

Figure 10:
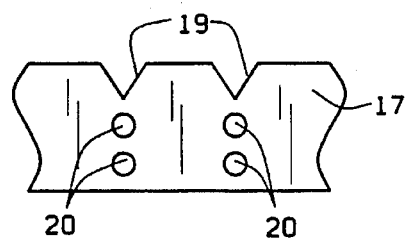
FIG. 10 is a sectional view taken along line 10—10 of FIG. 1.

On the opposite end wall 14a is an effluent weir 17 which is connected to an effluent pipe 18 so that the clarifier water can be removed from the clarifier 10. The weir plates have about 2" V-shaped notches 19 and the bottom of the weir trough is sloped to assist in washdown and maintenance. The weir plates 17 are adjustable in height using spaced openings 20 (FIG. 10) to provide control over the liquid level in the clarifier.

Figure 9:
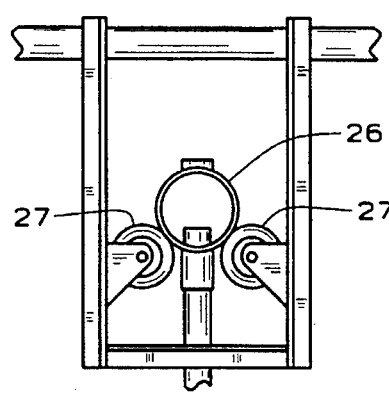
FIG. 9 is a sectional view taken along line 9—9 of FIG. 1.

The essential aspect of this invention is the combination scum and sludge removal assembly denoted by the number 25. The assembly 25 includes a horizontal torque tube 26 which is supported as a minimum, every 20' by submersible casters which form a cradle in which the horizontal torque tube is supported (FIG. 9).

A drive assembly includes a drive motor 28 which in turn is connected to a cycloidal speed reducer 29 which in turn is connected to a fly wheel 30. The fly wheel 30 converts the rotating motion to linear motion to rock the assembly 25 about a horizontal axis corresponding to the centerline of the torque tube 26. The fly wheel 30 is connected to the torque tube 26 by a connecting arm 31 and a tube torque arm 32 which is rigidly fastened to the tube 26 and pivotally fastened to the connecting arm 31.

The sludge withdrawal portion of the removal assembly 25 includes a plurality of adjustable flow vertical sludge handling tubes 33 which are supported by the torque tube 26 and are in communication with the inside of the torque tube 26. At the lowermost or intake end of the sludge handling tubes 33 are rakes 34 which sweep the inside clarifier floor 13 and allow sludge collected thereon to be forced up the sludge handling tubes 34 to the torque tube 26 by the pressure differential between the top of the liquid in the clarifier 10 and the top lip 37 of the sludge handling tube 33 where it is positioned in the torque tube 26. Flow of sludge is controlled by the differential pressure between the clarifier 10 and the sludge pit 45 caused by their respective water levels as will be explained hereinafter. The distance between the ends of the sludge handling tubes 34 and the clarifier floor 13 can be adjusted at the joint between the sludge handling tubes 34 and the torque tube 26. Adjustable collars 35 allow each of the sludge handling tubes 34 to be individually adjusted. This is used to adjust the flow of sludge through the tube 34. Since the flow is generated by pressure differential, the closer the tube opening is to the floor 13, the greater is the differential and consequently the flow.

Buoyant counterweights 36 can be used on each tube 34 to assist in rocking and return of the tube 34.

Scum is removed from the top of the liquid in the clarifier 10 by a ducking skimmer which consists of spaced segments of skimmer 40 positioned on the top of the torque tube 26. The skimmer segments 40 have upright side 40a which extend above the top of the torque tube 26 and terminate in an open top 41 which ducks or dips beneath the surface of the liquid in the clarifier 10 as the torque tube 26 rocks toward each side of the clarifier 10. The height of each skimmer segment 40 is adjusted to control the flow of scum from the clarifier 10.

A modification of the skimming arrangement is shown in FIG. 7 in that a closure 42 can be positioned over the opening 41 to prevent mixing of scum and sludge in the torque tube 26.

A sludge pit 45 is provided at one end of the clarifier 10 and is connected to the torque tube 26. The torque tube 26 is below the water level of the clarifier and is sealed in a liquid tight seal 46 from the sludge pit 45. Thus, when the water level of the pit 45 is below the level of the clarifier 10, a pressure differential exists which causes the sludge to be pumped from the clarifier 10. A screw pump 47 in the sludge pit 45 is used to return sludge and scum from the clarifier 10 to an aeration tank or a waste sludge holding tank digester. Operation of the pump 47 causes removal of sludge from the clarifier 10 because it creates the differential pressure.

A differential head pressure is created when the level of liquid in the sludge pit 45 (housing the screw pump 47 and a back-up submersible pump, if used) is lower than the liquid level in the clarifier 10. If the pump 47 in the sludge pit is turned off, water levels will equalize between the two tanks 10,45. Turning on the pump 47 creates a differential head which forces sludge from the floor of the clarifier 10 up the withdrawal tubes 33 attached to the common torque tube 26 which has been submerged just below the surface of the water. Liquid (settled sludge) forced up the withdrawal tubes 33 by differential head pressure flows through the submerged torque tube 26 and is discharged into the sludge pit 45 containing the screw pump/submersible pump 47.

Figure 11:
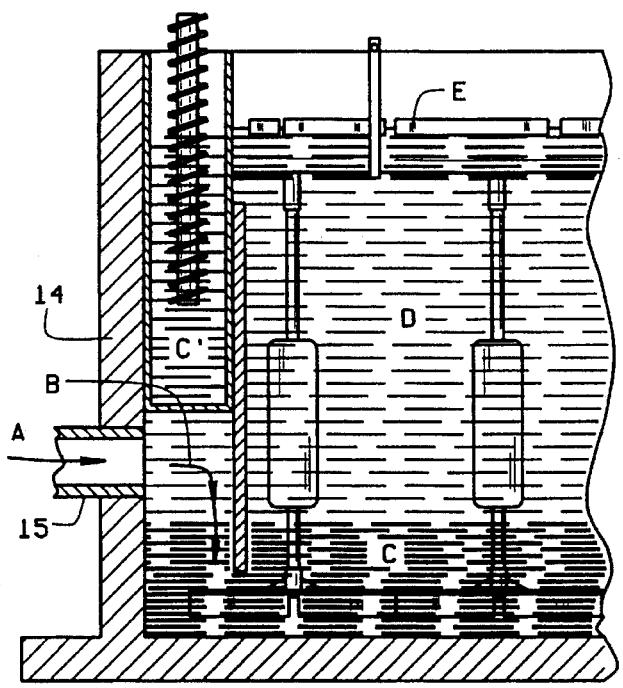
FIG. 11 is a fragmentary sectional view of the sludge pit and a portion of the clarifier with the water level the same in each.
Figure 12:
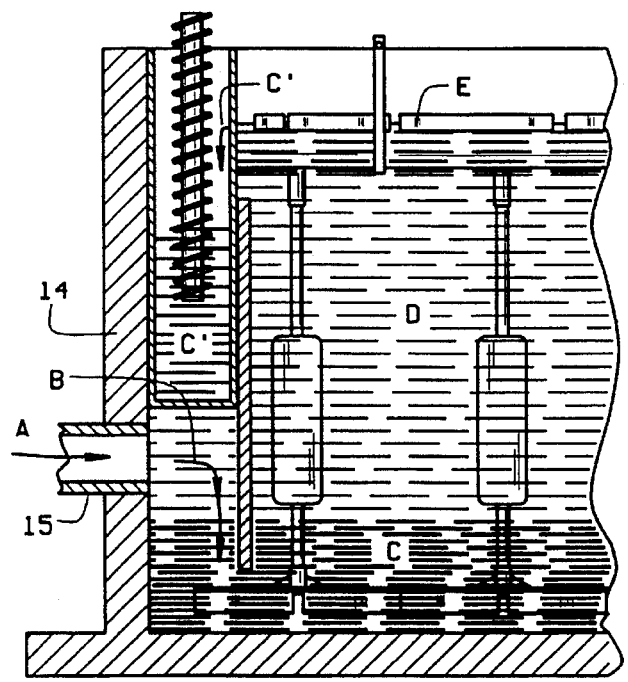
FIG. 12 is a view similar to FIG. 11 but showing the water level in the sludge pit lower than in the clarifier causing sludge to be forced out of the clarifier into the sludge pit.

This is shown in FIGS. 11 and 12. In FIG. 11, the water levels in the clarifier 10 and in the sludge put 45 are equal so that no flow occurs therebetween and therefore no sludge is removed from the floor of the clarifier 10. In FIG. 12, the pump 47 has been activated and the water level in the sluge pit 45 lowered so that a differential pressure exists which causes sludge and fluid to be forced up the withdrawal tube 33 and into the torque tube 26 and thence into the sludge pit 45.

OPERATION

The raw liquid to be clarified, such as sewage, etc., enters the clarifier 10 through the inlet 15 as indicated by the arrow "A" in FIG. 1. It is dispersed by the baffle 16 and directed toward the clarifier floor 12 as indicated by the arrows "B" in FIG. 1. As the liquid moves through the clarifier 10, the solid particles or sludge settle toward the floor 12. The sludge is indicated by the "C" in FIGS. 4–6. The clarifier liquid (indicated by "D" in FIGS. 4–6) rises to the top. The lighter than water material or scum, i.e., oils, fats, etc., accumulates on the top. The scum is indicated by "E" in FIGS. 4–6.

As the sludge handling tubes 33 move back and forth across the floor 12 of the clarifier 10, the sludge "C" is forced up and discharged into the center of the torque tube 26. This is indicated by the arrows C' in FIGS. 4–6. From the torque tube, the sludge "C" is discharged into the sludge pit 45 from which it is moved by the screw pump 47 to further treatment facilities.

Figure 5:
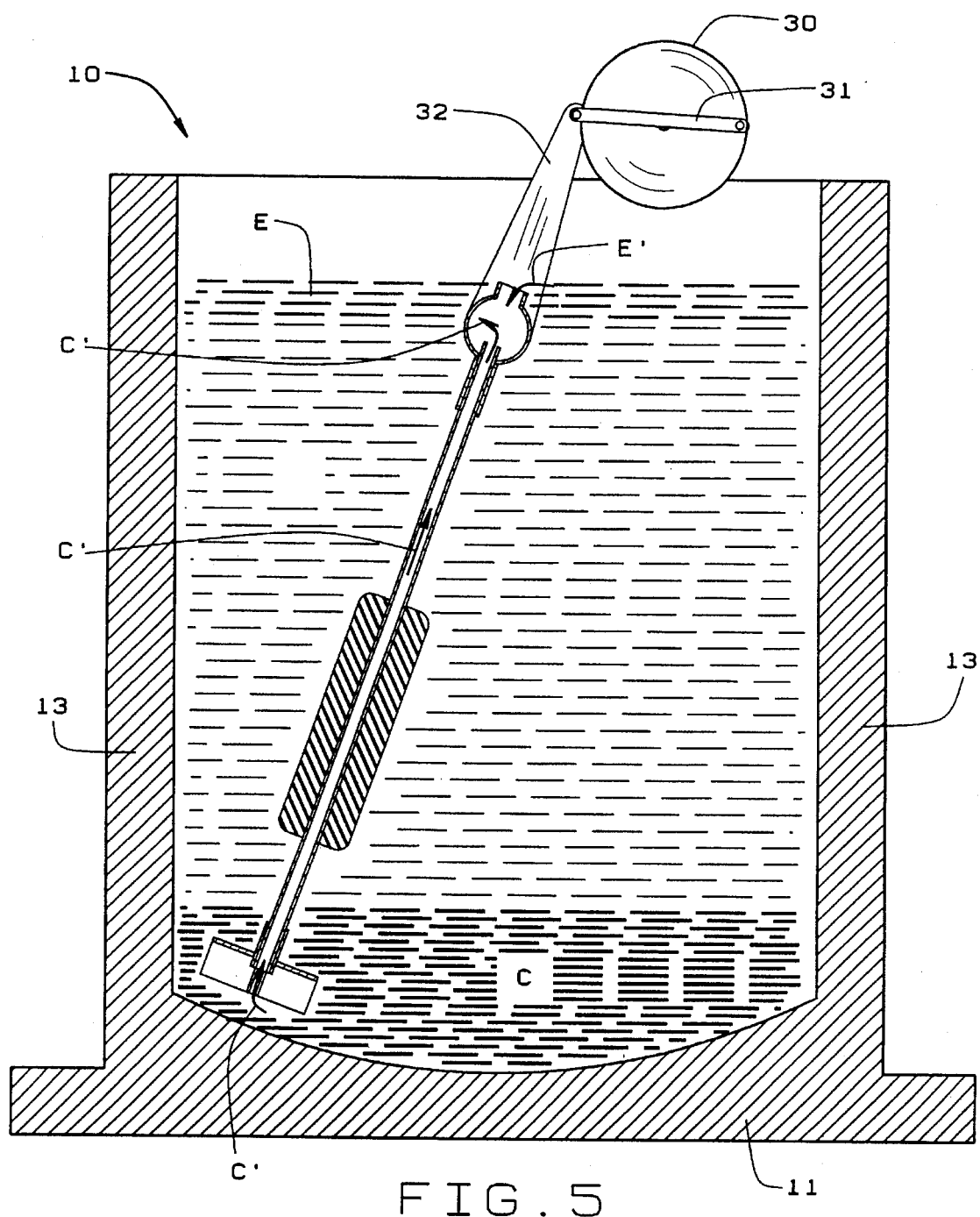
FIG. 5 is a view similar to FIG. 4 showing the collector assembly in its leftward most position.
Figure 6:
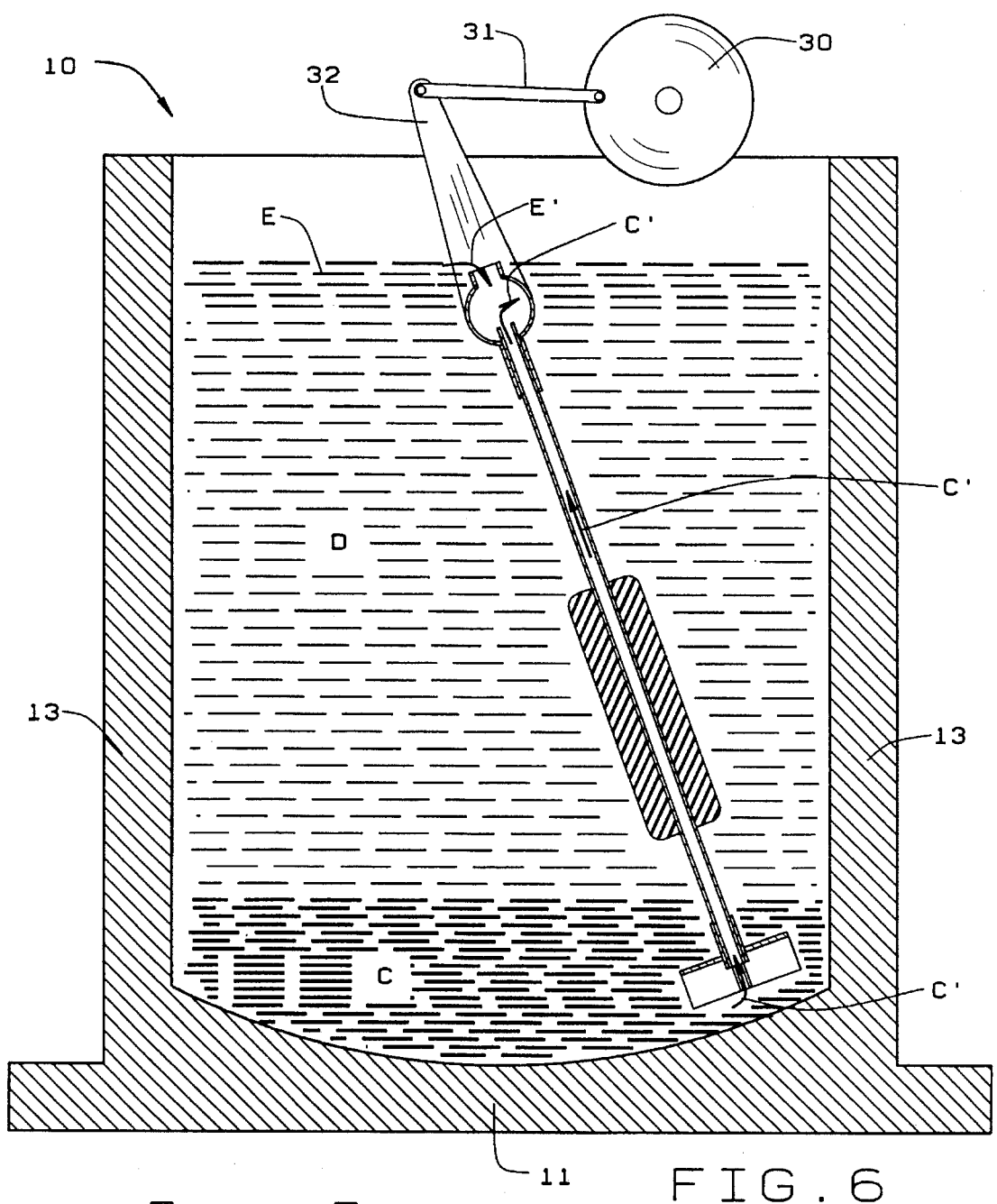
FIG. 6 is a view similar to FIGS. 4 and 5 showing the collector assembly in its rightward most position.

The scum "E" is decanted into the top opening 41 of the ducking skimmer 40 as the torque tube 26 is rocked between the side walls 13 as shown in FIGS. 5 and 6. The path of the scum "E" is indicated by the arrows E' in FIGS. 5 and 6. The scum "E" also travels through the torque tube 26 and is discharged into the sludge pit 45 for removal and further treatment.

When the pump 47 is inactivated, the liquid levels in the clarifier 10 and the sludge pit 45 equalize and there is no flow out of the torque tube 26. Consequently, there is no pickup of sludge "C" from the clarifier floor.

The clarified liquid "D" is removed at the weirs 17 through the effluent pipe 18 as indicated by the arrows D' in FIGS. 1 and 2.

This invention is intended to cover all changes and modifications of the example of the invention herein chosen for purposes of the disclosure which do not constitute departures from the spirit and scope of the invention.

What is claimed is:

1. A clarifier comprising
    a) a main clarifier tank having a waste suspension inlet,
    b) a sludge solids accumulation pit,
    c) a tubular member connecting the main clarifier tank and the sludge pit beneath the surface of the fluid level of the clarifier tank whereby sludge solids and liquid passes from the clarifier tank to the sludge pit and establishes a fluid level therein, said tubular member having an upwardly extending skimming member having an open top,
    d) a pump for moving fluid and sludge from the sludge pit to lower the fluid level therein,
    e) sludge pickup tubes connected at their top ends to the tubular member and depending therefrom toward the bottom of the main clarifier tank, the pickup tubes being connected with the interior of the tubular member whereby sludge solids from the clarifier is passed to the tubular member by the differential head pressure between the water level in the clarifier and the tops of the sludge pickup tubes and is discharged into the sludge pit when the fluid level in the sludge pit is lower than the fluid level in the clarifier, f) means for rocking the tubular member about its axis to duck the open top beneath the surface of the liquid in the clarifier tank to allow material on the surface to be skimmed to enter the open top section, and g) an effluent discharge to remove clarified effluent from the clarifier.

2. The clarifier of claim 1 including means for closing the open top of the skimming member.

3. The clarifier of claim 1 including a baffle positioned opposite the sludge inlet to direct the flow of inlet sludge toward the bottom of the clarifier.

4. The clarifier of claim 1 wherein the sludge pickup tubes have rakes on the ends thereof adjacent to the clarifier bottom.

5. The clarifier of claim 4 wherein the rakes are adjustable toward and away from the clarifier bottom.

6. The clarifier of claim 1 wherein the sludge pickup tubes have buoyant weights attached thereto.

7. The clarifier of claim 1 wherein the connection of the tubular member to the main clarifier tank and the sludge pit is sealed.

8. The clarifier of claim 1 including a discharge weir having an adjustable overflow level connected to the effluent discharge.

9. The clarifier of claim 8 wherein the weir has V-shaped openings to pass liquid and reject solids.

10. The clarifier of claim 1 wherein the main clarifier tank is rectangular.

11. The clarifier of claim 10 wherein the inside bottom surface is curved.

12. The clarifier of claim 1 wherein the means for rocking the tubular member includes a drive motor, a flywheel connected to the motor output shaft and a drive shaft connecting the periphery of the flywheel and the tubular member to rock the tubular member about the centerline of the tubular member.

13. A process for clarifying fluid waste suspensions containing sludge solids, lighter than water materials, and water in an apparatus having a main clarifier tank and a sludge pit comprising the steps of a) passing a fluid waste suspension into the clarifier tank at one end thereof to establish a fluid surface in the clarifier tank, b) moving the waste suspension through the tank and separating the suspension components, simultaneously settling the sludge solids to the bottom of the tank, floating the lighter than water materials to the surface of the fluid, and raising a clear water effluent toward the top of the tank and toward the opposite end thereof, c) simultaneously forcing the settled sludge upwardly through pickup tubes into a central collector having a portion positioned below the surface of the fluid in the clarifier, and skimming the floating material from the surface of the suspension into the central collector, d) discharging the sludge solids and skimmed material from the central collector into the sludge pit to establish a fluid level in the sludge pit, e) controlling the discharge of the sludge into the sludge pit by raising or lowering the fluid level in the sludge pit, and f) discharging clarified effluent from the said opposite end of the clarifier tank.

14. The process of claim 13 wherein the central collector has an open top and including the step of rocking the central collector back and forth to rake the sludge in the bottom of the clarifier with the pickup tubes and to dip the open top of the central collector beneath the surface of the fluid in the clarifier to skim materials from said surface.

15. A clarifier comprising a) a main clarifier tank having a waste suspension inlet and a bottom surface, b) a tubular member positioned in the clarifier tank, c) sludge pickup tubes connected to the tubular member and depending therefrom toward the bottom of the main clarifier tank, the pickup tubes being in fluid communication with the interior of the tubular member, d) means for moving the sludge solids from the bottom surface of the clarifier through the sludge pickup tubes to the tubular member, e) means for rocking the tubular member about its axis to move the sludge pickup tubes across the clarifier tank bottom surface, f) a sludge discharge to remove sludge solids from the tubular member, g) a skimmer for removing floating material from the surface of the waste suspension in the clarifier, and h) an effluent discharge to remove clarified effluent from the clarifier.

* * * * *